United States Patent [19]

Perronin et al.

[11] 4,032,495
[45] June 28, 1977

[54] WATER-REPELLENT AND OIL-REPELLENT COMPOSITIONS BASED ON FLUORINE COMPOUND

[75] Inventors: Jean Perronin, Chantilly; André Louis Dessaint, Nogent sur Oise, both of France

[73] Assignee: Produits Chimiques Ugine Kuhlmann, Paris, France

[22] Filed: Jan. 2, 1976

[21] Appl. No.: 645,979

Related U.S. Application Data

[63] Continuation of Ser. No. 339,668, March 9, 1973, abandoned.

[30] Foreign Application Priority Data

Mar. 10, 1972  France .......................... 72.08366

[52] U.S. Cl. .................... 260/29.6 F; 260/900; 260/29.7 D; 428/421
[51] Int. Cl.² ................. C08L 27/12; C08F 214/18
[58] Field of Search .............. 260/29.6 F, 29.7 D

[56] References Cited

UNITED STATES PATENTS

| | | | |
|---|---|---|---|
| 2,803,615 | 8/1957 | Ahlbrecht | 260/29.6 |
| 3,256,231 | 6/1966 | Johnson et al. | 260/29.6 |
| 3,378,609 | 4/1968 | Fasick et al. | 260/890 |
| 3,598,515 | 8/1971 | Moore et al. | 8/115.6 |

*Primary Examiner*—Harold D. Anderson
*Assistant Examiner*—E. A. Nielsen
*Attorney, Agent, or Firm*—Beveridge, DeGrandi, Kline, Lunsford

[57] ABSTRACT

Mixture comprising, on the one hand, an aqueous dispersion of a copolymer (A) containing in interpolymerized form:
1. 30% to 99% by weight of one or more monomers of the formula:

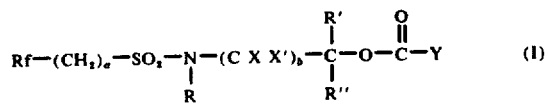

(I)

in which Rf represents a perfluoro chain, straight or branched, containing 1 to 20, preferably 2 to 10 carbon atoms, $a$ is a whole number between 2 and 20 inclusive, preferably equal to 2 or 4, R represents a hydrogen atom or an alkyl group containing 1 to 10 carbon atoms, a cycloalkyl group containing 5 to 12 carbon atoms, an hydroxyalkyl group containing 2 to 4 carbon atoms or an aryl group possibly substituted by an alkyl radical containing 1 to 6 carbon atoms, R', R'', X and X' may be the same or different and represent hydrogen atoms or alkyl groups containing 1 to 4 carbon atoms, $b$ is a whole number between 1 and 4 inclusive, preferably equal to 1 or 2, and Y represents the residue of an alkene-mono- or -di-carboxylic acid or a monoalkyl ester of such a dicarboxylic acid;

2. Up to 70% by weight of one or more compounds containing at least one polymerizable ethylene linkage and no perfluoro groups; and
3. up to 10% by weight of one or more monomers containing an ethylene linkage and at least one reactive group, and an aqueous dispersion of a copolymer (B) containing in an interpolymerized form:
1. 1% to 70% by weight of one or more monomers of formula (I).
2. 30% to 99% by weight of one or more compounds containing at least one polymerizable ethylene linkage and no perfluoro groups, and
3. 0% to 10% by weight of one or more monomers containing an ethylene linkage and at least one reactive group; compositions for oil-repellent and water-repellent treatment containing such a mixture; process for the preparation of such a mixture which comprises:

A. copolymerizing 30% to 99% by weight of one or more monomers of formula (1) as defined above, up to 70% by weight of one or more compounds containing at least one polymerizable ethylenic linkage, free from perfluoro groups, and up to 10% by weight of one or more monomers containing an ethylenic linkage and at least one reactive group, in aqueous phase, at a pH from 2 to 9 and in the presence of 0.01% to 5% of a copolymerization catalyst with B. copolymerizing 1% to 70% by weight of one or more monomers of formula (1) as defined above, 30% to 99% by weight of one or more compounds containing at least one polymerizable ethylenic linkage, free from perfluoro groups, and 0% to 10% by weight of one or more monomers containing an ethylenic linkage and at least one reactive group, in aqueous phase, at a pH from 2 to 9 and in the presence of 0.01% to 5% of a copolymerization catalyst; and C. mixing the aqueous dispersions obtained under (A) and (B); process for rendering a substrate water repellent and oil-repellent which comprises treating it with such a mixture and substrate treated with such a mixture.

19 Claims, No Drawings

WATER-REPELLENT AND OIL-REPELLENT COMPOSITIONS BASED ON FLUORINE COMPOUND

This is a continuation of application Ser. No. 339,668 filed Mar. 9, 1973, now abandoned.

The present invention relates to new compositions based on dispersions of copolymers, to their preparation and their application to the water-proofing and oil-proofing treatment of a substrate.

A number of polymeric materials is already known for the treatment of certain substrates, especially textile materials, to make them water- and oil-repellent, i.e. impermeable to water and oil. Flourine compounds in which the fluorine is usually present in the form of perfluoroalkyl groups are chiefly used for this purpose. Thus, in U.S. Pat. No. 2,803,615, polymers prepared from acrylic or methacrylic esters of N-(hydroxyalkyl)-perfluoroalkyl-sulfonamides have been proposed. However, it has been established that these polymers, although they may be readily available, are somewhat troublesome. An attempt has been made to use them in smaller quantities, preferably in synergistic mixtures with non-fluorine compounds which also impart oil-repellent and/or water-repellent properties. For example, the use of mixtures of copolymers containing perfluoro groups with non-fluorinated copolymers, or at least, not containing non-vinylic fluorine, has been suggested. The use of fluorinated polymers or copolymers mixed with polyorgano-siloxanes or with water-repellent agents such as stearamidomethyl-pyridinium chloride and the products resulting from the condensation of fatty chains with melamine or urea derivatives has also been proposed.

The compositions obtained from such mixtures generally impart good water-repellent properties to the substrates to which they are applied. Unfortunately, this result is often obtained to the detriment of the oil-repellent properties. In addition, the copolymers and the non-fluorinated compounds used in these mixtures have sometimes different behavior. The result is that either at the time of application, or after application to the substrate, phenomena of incompatibility or instability lead to less satisfactory performances or to certain defects.

We have now found compositions which make it possible to impart good oil-repellent and water-repellent characteristics to substrates and these compositions comprise a mixture of an aqueous dispersion of a copolymer (A) containing a large proportion of perfluoro groups with an aqueous dispersion of a copolymer (B) containing a relatively small proportion of perfluorinated groups.

According to the present invention a composition is provided comprising a mixture of an aqueous dispersion of a copolymer (A) containing in an interpolymerised form:

1. 30% to 99% by weight of one or more monomers of the formula:

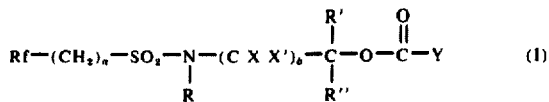

in which Rf represents a perfluoro chain, straight or branched, containing 1 to 20, preferably 2 to 10 carbon atoms, $a$ is a while number between 2 and 20 inclusive, perferably equal to 2 or 4, R represents a hydrogen atom or an alkyl group containing 1 to 10 carbon atoms, a cycloalkyl group containing 5 to 12 carbon atoms, an hydroxyalkyl group containing 2 to 4 carbon atoms or an aryl group possibly substituted by an alkyl radical containing 1 to 6 carbon atoms, R', R", X and X' may be the same or different and represent hydrogen atoms or alkyl groups containing 1 to 4 carbon atoms, $b$ is a whole number between 1 and 4 inclusive, preferably equal to 1 or 2, and Y represents the residue of an alkene-mono- or -dicarboxylic acid or a monoalkyl ester of such a dicarboxylic acid;

2. From 0% to 70%, by weight of one or more compounds containing at least one polymerisable ethylene linkage and no perfluoro groups; and 3. From 0% to 10%, by weight of one or more monomers containing an ethylene linkage and at least one reactive group, and an aqueous dispersion of a copolymer (b) containing in an interpolymerised form:
   a. 1% to 70% by weight of one or more monomers of formula (I).
   2. 30% to 99% by weight of one or more compounds containing at least one polymerisable ethylene linkage and no perfluoro groups, and
   c. 0% to 10% by weight of one or more monomers containing an ethylene linkage and at least one reactive group.

The weight of one or more monomers of the formula (I) contained in the copolymer (A) is greater than that of one or more monomers of the formula (I) contained in the copolymer (B) and preferably equal to or greater than 1.5 times and not superior to 30 times the weight of one or more monomers of the formula (I) contained in the copolymer (B), so that all the advantageous results of the invention can be obtained.

The proportions of copolymer (A) and copolymer (B), taken as dry material in the mixture, may vary within wide limits. Preferably mixtures are used of which the proportion of copolymer (A) varies from 30% to 80% by weight of the total mixture.

The copolymers according to the invention may be obtained for example by copolymerisation of the monomers in an aqueous emulsion according to the known processes, with or without the introduction of colloids and/or surface-active substances.

The polyfluorinated monomers of formula (I) may be prepared by known processes, for example by the esterification of alcohols of the general formula:

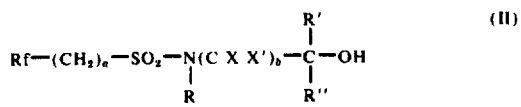

described in French Pat. No. 2,034,142 by means of an alkene-mono- or -di-carboxylic acid Y—CO—OH, such as acrylic, methacrylic, crotonic, maleic, fumaric, itaconic, citraconic or senecioic acids, in the presence of acid catalysts such as sulphuric acid or toluenesulphonic acid. The anhydrides or halides of these acids or the monoalkyl esters of the dicarboxylic acids such as, for example, acid methyl maleate or acid butyl itaconate, may also be used. Another method of preparation of these esters comprises trans-esterification with alkyl esters, such as methyl or ethyl esters, in the presence of suitable catalysts.

Examples of monomers containing at least one ethylene linkage and no perfluoro groups are lower olefinic hydrocarbons, halogenated or not, such as: ethylene, propylene, isobutene, 3-chloro-isobutene-1, butadiene, isoprene, chloro- and dichloro-butadienes, fluoro- and difluoro-butadienes, 2,5-dimethyl-1,5-hexadiene, vinyl, allyl and vinylidene halides such as: vinyl or vinylidene chloride, vinyl or vinylidene fluoride, allyl bromide, styrene and its derivatives such as: vinyl-toluene, α-methyl-styrene, α-cyanomethyl-styrene, divinyl-benzene, vinyl esters such as: vinyl acetate vinyl propionate, vinyl esters of acids marketed as "Versatic acids", vinyl isobutyrate, vinyl senecioate, vinyl succinate, vinyl isodecanoate, vinyl stearate, allyl esters such as allyl acetate and allyl heptanoate, allylvinyl ethers such as: cetyl vinyl ether, dodecyl vinyl ether vinyl alkyl ketones such as vinyl methylketone, acrylic methacrylic, α-chloro-acrylic, crotonic, maleic, fumaric, itaconic, citraconic and senecioic acids, their anhydrides and their esters such as the vinyl, allyl, methyl, ethyl, butyl, isobutyl, hexyl, heptyl, 2-ethylhexyl, lauryl, stearyl, or alkoxyethyl acrylates and methacrylates, dimethyl maleate, ethyl crotonate, acid methyl maleate, or acid butyl itaconate. Monomers may also be used such as for example acrylonitrile, methacrylonitrile 2-chloro-acrylonitrile, 2-cyanoethyl-acrylate, methyleneglutaronitrile, vinylidene cyanide, N-vinyl-carbazole, vinylpyrrolidone, tetra-allyloxyethane, the diacrylates and dimethacrylates of ethyleneglycol and propyleneglycol, divinylcarbinol, triacryloyl hexahydro-s-triazine, the acid phosphate of bis(methacryloyloxyethyl), divinyl carbonate, and the triallyl ether of pentaerythritol. The lower halogenated or nonhalogenated olefinic hydrocarbons preferably have 1 to 6 carbon atoms.

By "monomers containing an ethylene linkage and at least one reactive group" are meant monomers containing groups capable of reacting with another monomer, another compound, or with the substrate itself so as to establish a cross-link. These groups are well known and may be polar groups or functional groups such as for example the groups: OH, NH$_2$, NH-alkyl, COOMe, SO$_3$H,

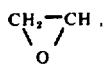

CN, CHO,

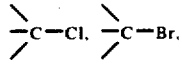

—SO$_2$—CH=CH$_2$ or —NH—CO—CH=CH$_2$. As such may be mentioned the hydroxyalkyl acrylates and methacrylates such as ethyleneglycol monoacrylate, propyleneglycol monomethacrylate, the acrylates and methacrylates of polyalkyleneglycols, allyl alcohols, allyl glycollates isobutenediol, allyloxy-ethanol, acrylamide and methacrylamide, maleamide and maleimide, N-(cyanoethyl)acrylamide, N-isopropyl-acrylamide, diacetone-acrylamide, N-(hydroxy-methyl) acrylamides and methacrylamides, N-(alkoxymethyl) acrylamides and methacrylamides, the hydroxymethyl derivatives of 2-vinyl-4,6-diamino s-triazine and of isobutenediol carbamate, sodium acrylate or methacrylate, vinylsulphonic and p-styrenesulphonic acids and their alkali metal salts, 3-amino-crotononitrile, mono-allylamine, vinyl-pyridines, glycidyl acrylate and methacrylate, allyl-glycidyl ether, alkyl-cyanoacrylates such as isopropyl cyano-acrylate or ethyl 2-cyano-3-dimethylamino acrylate, dimethylamino-ethyl acrylate and methacrylate, acrolein, and acryloyl chloride.

The surface-active substances which may be used for the copolymerisation of the monomers in aqueous emulsion may be anionic, non-ionic, cationic or amphoteric. The hydrophobic part of the surface-active substance may be a hydrocarbon, fluorinated or not. For example, anionic emulsifiers which may be mentioned are alkali metal alkylsulfates such as ammonium, sodium or potassium dodecylsulfates, sodium dodecylpolyglycol ether sulfate, sodium sulforicinate, the alkylsulfonates such as the alkali metal salts of sulfonated paraffins, the fatty acid salts such as sodium laurate, triethanolamine oleate or abietate, the alkylaryl-sulfonates such as sodium dodecylbenzenesulfonate, or the alkali metal sulfates of oxyethylenated alkylphenol. Examples of nonemulsifiers are the condensation products of ethylene oxide with fatty alcohols, alkylphenols, polypropyleneglycols, as well as with amines, amides and fatty acids, such as the condensation product of a mole of oleyl alcohol with 20 moles of ethylene oxide, the condensation product of a mole of oleyl alcohol with 20 moles of ethylene oxide, the condensation product of a mole of lauroyl alcohol or nonylphenol with 10 moles of ethylene oxide. The esters of fatty acids and polyols may also be used, such as for example anhydrosorbitol monooleate or glycerol monolaurate. Examples of cationic emulsifiers are the salts of amines or quaternary ammonium compounds which contain at least one alkyl or alkylaryl group with a long chain such as trimethylhexadecylammonium chloride or bromide, trimethyldodecylammonium chloride or bromide, cetylpyridinium bromide, lauryldimethylbenzylammonium bromide, dimethyldilaurylammonium chloride, stearylamine acetate, dimethyloctadecylamine acetate, the laurate of N,N-diethylaminoethanol made into the quaternary compound by dimethyl sulfate. Amine oxides may also be used such as for example lauryldimethylamine oxide or stearyldimethylamine oxide. Examples of amphoteric emulsifiers which may be mentioned are sodium N-lauryl-β-amino-butyrate, sodium N-lauryl-β-imino-dipropionate and sodium N-lauryl-β-amino-propionate. Examples of emulsifiers with fluorinated chains are ammonium perfluoro-octanoate, potassium N-perfluorooctylsulphonyl-N-ethyl-aminoacetate, N-methyl-N,N-bis(hydroxy-ethyl) -N-2-perfluoro-octyl-ethyl)-ammonium sulphomethylate or -iodide, sodium N-methyl-N-[3-(3-perfluoro-octyl-propionyl-amino)-propyl] 3-amino-propionate, N-(2-perfluoro-octyl-ethyl)-diethanolamine, the N-(hydroxymethyl)carbamade of 1H, 1H, 2H, 2H-heptadecafluoro-decanol and its ethers with an alcohol or an aminoalcohol, as well as the amine or quaternary ammonium salts obtained by the action of organic or mineral acids or of reagents such as methyl sulfate and lower alkyl halides on amino-alcohol ethers, the lower alkyl halides preferably have 1 to 6 carbon atoms.

In addition to, or instead of, these surface-active fluorinated or non-fluorinated, anionic, non-ionic, cationic or amphoteric surface-active agents, which may if desired be used in admixture, colloids may also be used such as for example polyvinyl alcohol, carboxymethylcellulose, methylcellulose, hydroxyethylcellulose, sodium alginate, acrylic or methacrylic polymers or copolymers or their water-soluble salts, copolymers of styrene-maleic anhydride, diisobutylene -maleic anhydride or their salts.

Other ingredients well known in the technique of emulsion polymerisation may be added to these surface active compounds, such as for example chelating agents, buffers, salts of mineral or organic acids, adjuvants capable of regulating the pH, hydrotopic agents, stabilizers, solvents fluorinated or non-fluorinated such as acetone, methylethylketone, γ-butyrollactone, methyl alcohol, ethyleneglycol, diacetonealcohol, isophorone, tetrahydrofuran, acetic acid, ethyl acetate, trichlorotrifluoroethane, hexafluoroxylene or trifluorotoluene.

In order to initiate the polymerisation reaction, catalysts capable of producing free radicals, preferably peroxy compounds, may be used, such as for example, sodium, ammonium or potassium persulphates, alkali metal perborates, hydrogen peroxide, sodium or barium peroxides, cumene hydroperoxide, butyl hydroperoxide, benzoyl peroxide, peracetic acid, oxides of amines, ceric ammonium nitrate. 2,2'-azo-bis-isobutyronitrile, 2,2'-azo-bis(2,4-dimethyl-4-methoxy valeronitrile), 4,4'-azo-bis(4-cyanopentanoic) acid or its alkali metal salts, 2,2'-azodi-isobutyramidine dihydro chloride are examples of other initiators that may be used. The amounts of the initiators used may vary between 0.01% and 5% with respect to the weight of the monomers to be copolymerised, preferably 0.1 to 1.5%.

The copolymerisation is generally effected at a pH ranging from 2 to 9 and at a temperature between 40° C. and 120° C., preferably between 50° C. and 90° C. But it is possible to operate at higher or lower temperatures. For example, the use of redox catalysts, such as the systems persulfatesferrous salts, persulfate-hydroxy-methanesulfinate of sodium, hydrogen peroxide-bisulfite, hydrogen peroxide-2,3-butanedione, may be useful for activating the reaction or lowering the copolymerisation temperature. Finally, the copolymerisation may be carried out discontinuously, continuously or gradually provided that an apparatus for discontinuous, continuous or gradual operations is used respectively.

The copolymers of the invention may have different types of structure. They may be homogeneous or have a segmented or heterogeneous form. They may also consist of mixtures of homopolymers or of fluorinated or non-fluorinated copolymers. The term "copolymers" used in the present invention includes all these structures, as well as all types of copolymers known to the art.

In order to regulate the molecular weight and the K value of the copolymers (H. Gibello — "Les Vinyliques d'Aujourdhui" Dunod — Paris 1953, p.264, and M. Fikentscher - "Cellulose Chemie" - 13, 1932, p.58 to 74), agents for chain transfer, such as the alkylmercaptans, for example tertio-dodecylmercaptan, n-dodecylmercaptan, n-octylmercaptan, carbon tetrachloride, carbontetrabromide, chloroform, or triphenyl methane may be used. The amounts to be used are a function of the K values to be obtained. They may vary from 0.01% to 3% with respect to the weight of the monomers and are preferably between 0.05% and 0.5%. the proportion of dry materials in the dispersion of copolymers according to the invention may vary within very wide limits. It is however advantageous to use latex in which the proportion of dry materials is between 20% and 50%.

Examples of substrates capable of being made oil and water repellent by the mixtures of copolymers according to the invention are woven or non-woven articles based on cellulose or regenerated cellulose, natural, artificial or synthetic fibres such as cotton, cellulose acetate, wool, silk, or polyamide, polyester, polyolefine, polyurethane and acrylonitrile fibres. In addition, paper, cardboard, leather, plastic materials, glass, wood, metals, porcelain and concrete may be mentioned. Metals, alloys or metallic surfaces based on anodised or non-anodised aluminium, iron, steel, copper, magnesium, chromium, zinc or tin can, for example, be treated advantageously in accordance with the invention.

The compositions according to the invention are applied in the form of aqueous dispersions according to the known techniques, for example by coating, impregnation, immersion, spraying, foularding, or couching. They may contain for example, in addition to copolymer dispersions (A) and (B), non-aqueous solvents which may or may not be compatible with the aqueous dispersions of copolymers. The articles thus treated may be dried and possibly given a heat treatment at a temperature, for example, between 120° C and 230° C.

With the object of imparting to the substrates additional properties, various ingredients may be added to the compositions of the invention such as for example catalysts capable of favouring the cross-linking of the copolymers with the substrate, heat-condensable products, waterproofing substances, fireproofing substances, fungicides, antistatic substances, softeners, buffering agents, sequestering agents, swelling agents, fluorescent brightening agents, vinyl or acrylic latex polyalkalenes, polyglycols or colloids.

The oil-repellent properties of the compositions according to the invention may be evaluated by using, for example fortextile articles, the "Test 3 M" described by E. J. Grajeck and W. H. Petersen in "Textile Research Journal", 32, (1962), 323. The method described in "A A T C C Technical Manual" — Test Method 118 — 1966 — may also be used.

As regards proof of the water-repellent properties, the test of resistance to wetting may be used ("Spray test" according to "A A T C C Technical Manual" — Test Method — 22 — 1967).

The mixtures of copolymers according to the invention enable excellent oil- and water-repellent properties to be imparted to the substrates to which they are applied. The articles treated under these conditions have a good resistance to washing in soapy water and to dry cleaning in a solvent medium.

The invention is illustrated by the following Examples in which the parts are parts by weight.

EXAMPLE 1 a. In a container fitted with a stirrer, a reflux condenser and a heating device, 6.4 parts of a polyfluorinated monomer of the formula:

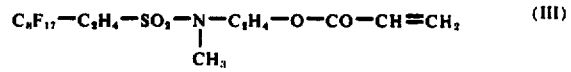

(III)

3.4 parts by heptyl methacrylate and 0.01 parts of lauryl mercaptan are dispersed in an aqueous phase containing 0.35 parts of 57% aqueous solution of N-methylol acrylamide, 0.6 parts of N,N-dimethyl-octadecylamine, 1.5 parts of acetic acid and 27 parts of water. The mixture is purged with nitrogen and heated to about 80° C. Then a solution of 0.06 parts of 4,4'-azo-bis-(4-cyano-pentanoic) acid in 3.1 parts of acetone are added. The temperature of 80° C. is maintained for a further hour. It is left to cool and filter. A latex $A_1$ is thus obtained of which the proportion of dry material is about 24%. The special fineness of this dispersion is remarkable since an aqueous solution at 0.25 g/liter of dry material shows in monochromatic light ($\alpha$= 5200lA) and under a thickness of 1 cm, an "optical density" of 0.0044.

b. When operating as in paragraph (a), but using only 3.4 parts of monomer of formula III and 6.4 parts of heptyl methacrylate instead of 3.4 parts, a latex $B_1$ is thus obtained which is very finely dispersed and its proportion of dry material is about 24%, and its "optical density", measured under the same conditions as in (a), is 0.0088.

c. 50 parts of latex $A_1$ are mixed with 50 parts of latex $B_1$. A composition $A_1 + B_1$ is thus obtained in which the proportion of the monomer of formula III, is an interpolymerised form, expressed with respect to the total weight of the monomers, is 49%. This composition is diluted with water so as to obtain two foularding baths containing 5.8 g and 11.6 g of dry material per liter respectively.

For comparison, operating under the same conditions as in paragraph (a), a latex C is prepared which contains, in interpolymerised form, 49 parts of the monomer of formula III, 49 parts of heptyl methacrylate and 2 parts of N-methylol acrylamide. This latex is diluted with water so as to obtain two foularding baths containing 5.8 g and 11.6 g of dry material per liter respectively.

A cotton satin fabric and a polyester taffeta fabric are foularded in these 4 baths with respective rates of expression or about 70% and 40%. After squeezing out and drying the fabrics are treated for 4 minutes at 165° C. by means of a Benz thermo - condenser.

The water- and oil-repellent properties of the fabrics thus finished are indicated in the following Table, which shows the superiority of the mixture $A_1 + B_1$ according to the invention as compared with the copolymer C used alone.

EXAMPLE 2 a. In a container fitted with a stirrer, a reflux condenser and a heating device, 9.4 parts of the polyfluorinated monomer of the formula:

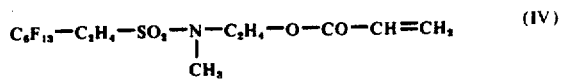

and 0.4 parts of heptyl methacrylate are dispersed in an aqueous phase comprising 0.35 parts of a 57% aqueous solution of N-methylol acrylamide, 0.25 parts of N,N-dimethyl-octadecylamine, 0.125 parts of acetic acid and 22.5 parts of water. The mass is purged with nitrogen and heated to about 70° C. Then a solution of 0.125 parts of 130-volume hydrogen peroxide in 2.5 parts of acetone is added. The copolymerisation is carried out under a stream of nitrogen while maintaining the temperature at 70° C. for about 2 hours. After cooling and filtering, a latex $A_2$ is thus obtained which is finely dispersed and has a proportion of dry material of about 28%.

b. The operation is as in paragraph (a), but on the one hand, the 9.4 parts of monomer of formula (IV) and the 0.4 parts of heptyl methacrylate are replaced by 0.4 parts of monomer of formula (IV) and 9.4 parts of heptyl methacrylate respectively and on the other hand, the hydrogen peroxide is replaced by 0.025 parts of 4,4'-azo-bis(4-cyano-pentaoic) acid. A finely dispersed latex $B_2$, of which the proportion of dry material is about 28%, is thus obtained.

c. A composition $A_2 + B_2$ according to the invention is then prepared by mixing 50 parts of latex $A_2$ and 50 parts of latex $B_2$. This composition is diluted with water so as to obtain two foularding baths containing respectively 5.8 g and 11.6 g of dry material per liter, in which a "cotton satin fabric" and a "Tergal Twill" fabric are foularded with respective rates of expression of about 70% and 45%. After drying, the fabrics are treated for 4 minutes at 165° C. by means of BENZ thermo-condenser.

The following Table summarises the oil-repellent and water-repellent characteristics of the fabrics thus treated.

| Dry material | Oil-proofing test AATCC | Waterproofing test "Spray-Test" |
|---|---|---|

| | | Polyester fabric | | | | Cotton fabric | | | |
|---|---|---|---|---|---|---|---|---|---|
| | | Oilproofing test "3 M" | | Waterproofing test "Spray-Test" | | Oilproofing test "3 M" | | Waterproofing test "Spray-Test" | |
| Composition | Dry material content of the bath (g/l) | before washing | after washing | before washing | after washing | before washing | after washing | before washing | after washing |
| $A_1 + B_1$ | 11.6 | 140 | 100 | 100 | 100 | 120 | 100 | 90 | 80 |
|  | 5.8 | 140 | 100 | 100 | 100 | 100 | 90 | 80 | 70 |
| C | 11.6 | 130 | 90 | 100 | 100 | 120 | 90 | 80 | 70 |
|  | 5.8 | 130 | 80 | 100 | 100 | 100 | 80 | 80 | 70 |

By "washing" is meant washing in a washing machine with a horizontal drum, for 15 minutes at 50° C. in a bath containing 3 g/liter of soap and 2 g/liter of sodium carbonate, followed by 3 rinsings of 5 minutes each in fresh water.

| Fabric | content of the bath (g/l) | before washing | after washing | before washing | after washing |
|---|---|---|---|---|---|
| Tergal Twill | 11.6 | 6 | 6 | 100 | 100 |
|  | 5.8 | 6 | 5 | 100 | 100 |
| Cotton satin | 11.6 | 6 | 5 | 90 | 80 |
|  | 5.8 | 6 | 3 | 80 | 80 |

EXAMPLE 3 a. The operation is as in paragraph (a) of Example 1, but 5.4 parts of the monomer of formula (III), 4.4 parts of heptyl methacrylate and 0.2 parts of N-methylol acrylamide are used. A latex $A_3$ containing about 24% of dry material is thus obtained.

b. In the same way, a latex $B_3$ containing about 24% of dry material is prepared from 4.4 parts of monomer of formula (III), 5.4 parts of heptyl methacrylate and 0.2 parts of N-methylol acrylamide.

c. A composition $A_3 + B_3$ is then prepared by mixing 50 parts of the latex $A_3$ with 50 parts of the latex $B_3$. This composition is diluted with water so as to obtain three foularding baths for foularding apparatus having horizonal rollers to enable paper to be foularded ("Size press"), containing respectively 11.5 g, 5.75 g and 2.88 g of dry material per liter.

Three samples of "opaline paper" weighing 50 g/m² are foularded in these baths and with a discharge rate of about 50%. After squeezing out, the paper is dried for about 15 minutes at a temperature between 120° C and 130° C.

The estimation of the ability of the paper thus treated to repel grease is evaluated according to the "3 M' - Paper" test by means of different mixtures of castor oil, heptane and toluene (Kit-Value-Norme A 2-2 78 – of 21st November 1963).

| Concentration of dry material in the baths (in g/l) | Test "3 M - Paper" |
|---|---|
| 11.5 | 100 |
| 5.75 | 90 |
| 2.88 | 80 |

EXAMPLE 4 a. In a container fitted with a stirrer, a reflux condenser and a heating device, 49 parts of the monomer of the formula (III), 49 parts of heptyl methacrylate and 0.1 parts of laurylmercaptan are dispersed in an aqueous phase consisting of 3.5 parts of a 57% aqueous solution of N-methylolacrylamide, 10 parts of cetyl-trimethylammonium bromide, 6 parts of acetic acid and 280 parts of water. The mass is purged with nitrogen and heated up to about 60° C. Then 4 parts of 130 volume hydrogen peroxide, 2 parts of 2,3-butanedione (5% solution) and 32 parts of acetone are added, the mixture is heated to 80° C. and maintained, under a stream of nitrogen, at this temperature for about 2 hours. After cooling and filtering, a finely dispersed latex $A_4$, of which the proportion of dry material is about 25%, is thus obtained.

b. 32.5 parts of water, 1 part of 130 volume hydrogen peroxide, 0.25 parts of 4,4'-azo-bis-(4-cyano-pentanoic) acid and 5 parts of acetone are charged into a container identical with the above-mentioned container. The mass is purged with nitrogen and heated up to 70° C. Then an emulsion is introduced in a period of 3 to 4 hours, while stirring, which emulsion is obtained by dispersing a mixture of 19 parts of the monomer of the formula (IV), 12.5 parts of acetone, 0.25 parts of 4,4'-azo-bis(4-cyano-pentanoic) acid, 79 parts of heptyl methacrylate and 1 part of tertiododecylmercaptan in an aqueous phase consisting of 190 parts of water, 4 parts of N,N-dimethyl-octadecyamine, 5 parts of acetic acid and 3.5 parts of a 57% aqueous solution of N-methylol-acrylamide. During the introduction, the mixture is maintained under a stream of nitrogen at a temperature of about 70° C. when it is finished it is kept for a further 2 hours at 70° C, then cooled and filtered. A latex $B_4$ is obtained which is finely dispersed, and the proportion of dry material thereof is about 32%.

c. A composition $A_4 + B_4$ according to the invention is then prepared by mixing 280 parts of $A_4$ latex and 93.75 parts of $B_4$ latex. By dilution with water, two foularding baths are prepared with this composition which contain respectively 5.8 and 11.6 g of dry material per liter, in which a cotton fabric and a polyester fabric are foularded with respective rates of expression of about 70% and 45%. After drying, the fabrics are treated for 4 minutes at 165° C. by means of a BENZ thermo-condenser.

The following Table indicates the results of the oil-proofing and waterproofing tests effected on the fabrics thus treated.

| Nature of the fabric | Concentration of dry material in the bath (g/l) | Oil-proofing (Test 3 M) | Waterproofing "Spray-Test" |
|---|---|---|---|
| Polyester | 11.6 | 90 | 90 |
|  | 5.8 | 90 | 70 |
| Cotton | 11.6 | 80 | 90 |
|  | 5.8 | 60 | 80 |

EXAMPLE 5 a. In a container fitted with a stirrer, a reflux condenser and a heating device, 49 parts of heptyl methacrylate are dispersed in an aqueous phase consisting of 1.75 parts of a 57% aqueous solution of N-methylol acrylamide, 1 part of N,N-dimethyl-octadecylamine, 1.25 parts of acetic acid, 0.03 parts of sodium chloride, 110 parts of water, 12 parts of acetone and 0.12 parts of 4,4'-azo-bis-(4-cyano-pentanoic) acid. The mass is purged with nitrogen and heated to about 70° C. It is maintained under a stream of nitrogen at this temperature for about 3 hours, left to cool, and then 49 parts of the monomer of formula (IV), 1.75 parts of a 57% aqueous solution of N-methylol acrylamide, 1 part of cetyltrimethylammonium bromide and a mixture of 180 parts of water and 50 parts of acetone are added.

The mass is again purged with nitrogen, heated to 70° C. and 2 parts of 130 volume hydrogen peroxide are added. It is left under a stream of nitrogen and at 70° C. for about 3 hours, cooled and filtered. A finely dispersed latex $A_5$ is thus obtained, of which the proportion of dry material is about 22%.

b. The operation is exactly as in paragraph (b) of Example 4, except that 19.5 parts of the monomer of formula (IV) are used instead of 19 parts, 79.5 parts of heptyl methacrylate are used instead of 79 parts and only 1.75 parts of 57% aqueous solution of N-methylol acrylamide are used. A finely dispersed latex $B_5$ is thus obtained, of which the proportion of dry material is about 30.4%.

c. A composition $A_5 + B_5$ containing 24% of dry material is prepared by mixing 14.5 parts of the dispersion As with 4.5 parts of the dispersion. $B_5$.

In the same conditions as in Example 4 and with the same fabrics, this composition leads to the following results:

| Concentration of the dry material in the bath (g/l) | Polyester fabric | | Cotton fabric | |
|---|---|---|---|---|
| | Oil proofing "Test 3 M" | Water proofing "Spray-Test" | Oilproofing "Test 3 M" | Water proofing "Spray-Test" |
| 11.6 | 100 | 100 | 90 | 80 |
| 5.8 | 90 | 100 | 70 | 80 |

EXAMPLE 6 a. In a container fitted with a stirrer, a reflux condenser and a heating device, 8.9 parts of the monomer of formula (IV) and 0.9 parts of butyl acrylate are dispersed in an aqueous phase consisting of 0.5 parts of sodium perfluoro-octanoate, 5.5 parts of acetone, 24 parts of water and 0.35 parts of a 57% aqueous solution of N-methylol acrylamide. The mass is purged with nitrogen and heated to about 65° C. 1.4 parts of a 4% aqueous solution of potassium persulphate are then added and the mixture is maintained at 65° C. under a stream of nitrogen for about 2 hours. After cooling and filtering, a finely dispersed latex $A_6$ is obtained, of which the proportion of dry material is about 25%.

b. The operation is as in paragraph (a), except that 0.9 parts of the monomer of formula (IV) are used instead of 8.9 parts, 8.9 parts of butyl acrylate are used instead of 0.9 parts and 1.6 parts of acetone are used instead of 5.5 parts. A finely dispersed latex $B_6$ is thus obtained, of which the proportion of dry material is about 27%.

c. 50 parts of the latex A6 and 43.6 parts of the latex $B_6$ are admixed. A composition $A_6 + B_6$ containing 26% of dry material is thus obtained, with which a dyebath containing per liter 200 g of the composition $A_6 + B_6$ and 40 g of an aqueous dispersion of the pigment C.I. 20040 is prepared.

A cotton cloth is foularded in this bath with a rate of expression of about 80%. After drying, the fabric is treated for 5 minutes at 180° C. in a BENZ thermo-condenser. A fabric dyed in a yellow shade is obtained, which is fast to light and has good water-repellent and oil-repellent properties.

| Characteristics | Oilproofing test AATCC | Waterproofing test "Spray-Test" |
|---|---|---|
| Treated yellow fabric | 7 | 80 |
| untreated white fabric | 0 | 0 |

EXAMPLE 7

This Example enables a comparison to be made between one aspect of the prior art and the invention.

a. In a container fitted with a stirrer, a reflux condenser and a heating device, 98 parts of the monomer of formula (IV) are dispersed in an aqueous phase consisting of 2.5 parts of N,N-dimethyloctadecylamine, 1.25 parts of acetic acid, 3.5 parts of a 57% aqueous solution of N-methylol acrylamide and 220 parts of water. The mass is purged with nitrogen and heated up to about 65° C. Then a solution of 0.25 parts of 4,4'-azo-bis-(4-cyano-pentanoic) acid in 25 parts of acetone is added. The mixture is maintained at 65° C. under a stream of nitrogen for about an hour, 0.5 parts of 130 volume hydrogen peroxide are added and the temperature is maintained at 65° C. for a further hour. After cooling and filtering, a finely dispersed latex A' is obtained, of which the proportion of dry material is about 28%.

b. In an apparatus identical to the above, 98 parts of heptyl methacrylate are dispersed in an aqueous phase comprising 3.5 parts of a 57% aqueous solution of N-methylol-acrylamide, 2 parts of N,N-dimethyloctadecylamine, 2.5 parts of acetic acid, 0.06 parts of sodium chloride, 220 parts of water, 24 parts of acetone and 0.24 parts of 4,4'-azo-bis-(4-cyano-pentanoic) acid. The mass is purged with nitrogen and heated up to about 70° C. It is maintained at 70° C. under a stream of nitrogen for about 3 hours. After cooling and filtering, a non-fluorinated latex B' is thus obtained, of which the proportion of dry material is about 30%.

c. 53.6 parts of the latex A' and 50 parts of the latex B' are admixed. A mixture A' + B' containing 29% of dry material is thus obtained. This mixture is diluted with water so as to obtain two foularding baths containing respectively 5.8 g and 11.6 g of dry material per liter.

A second series of foularding baths is prepared by diluting the composition $A_2 + B_2$ of Example 2 with water, so as to obtain like wise 5.8 g and 11.6 g of dry material per liter.

A cotton fabric and a polyester fabric are foularded in these baths with respective rates of expression of about 70% and 45%. After drying, the fabrics are treated at 165° C for 4 minutes by means of a BENZ thermo-condenser.

The water-repellent and oil-repellent properties of the fabrics thus treated are indicated in the following Table which shows the superiority of the mixture $A_2 + B_2$ according to the invention compared with the mixture A' + B' constituted by a strongly fluorinated copolymer and a non-fluorinated copolymer, although the two mixtures $A_2 + B_2$ and A' + B' contain the same proportion of polyfluorinated monomer of formula (IV).

| Composition | Concentration of dry material in the bath (g/l) | Polyester fabric | | Cotton fabric | |
|---|---|---|---|---|---|
| | | Oil-proofing Test 3 M | Water-proofing Spray-Test) | Oil-proofing Test 3 M | Water-proofing Spray Test) |
| A' + B' | 11.6 | 80 | 100 | 90 | 80 |
| | 5.8 | 70 | 100 | 0 | 70 |
| $A_2 + B_2$ | 11.6 | 90 | 100 | 100 | 90 |
| | 5.8 | 80 | 100 | 70 | 90 |

EXAMPLE 8

In a container fitted with a stirrer, a reflux condenser and a heating device, 89 parts of the monomer of formula (IV) and 9 parts of heptyl methacrylate are dispersed in an aqueous phase containing 2.5 parts of N,N-bis-(hydroxyethyl)-2-perfluoro-octyl-ethylamine, 12.5 parts of acetic acid, 3.5 parts of a 57% aqueous solution of N-methylol-acrylamide and 200 parts of water. The mass is purged with nitrogen and heated up to about 65° C. Then 25 parts of acetone, 0.25 parts of 4,4'-azo-bis-(4-cyano-pentanoic) acid and 1.25 parts of 130 volume hydrogen peroxide are added. The temperature is maintained at 65° C. under a stream of nitrogen for about 2 hours, and the mass is left to cool and filtered. A finely dispersed latex $A_8$ is thus obtained, of which the proportion of dry material is about 29%.

172.4 parts of the latex $A_8$ are mixed with 156.2 parts of the latex $B_4$ described in paragraph (b) of Example 4. A composition $A_8 + B_4$ according to the invention is thus obtained, which contains 30% of dry material, and is applied to a leather from good quality calf. After drying for 4 hours at 60° C. the surface of the leather has the characteristics indicated in the following Table:

| Characteristics | Oilproofing test AATCC (118 – 1966) | Waterproofing test AATCC 22– 1967) |
|---|---|---|
| Treated leather | 4 | 90 |
| Untreated leather | 0 | 50 |

The following Table gives the results obtained when the composition $A_8 + B_4$ is applied to a wood surface of "sandpapered oak" and dried for an hour at 60° C.

| Characteristics | Oilproofing test AATCC (118 – 1966) | Waterproofing test AATCC (22 – 1967) |
|---|---|---|
| Treated wood | 4 | 90 |
| Untreated wood | 0 | 0 |

EXAMPLE 9

In a container fitted with a stirrer, a reflux condenser and a heating device, 86 parts of the monomer of formula (IV), 2 parts of ethyleneglycol monomethacrylate, 2 parts of ethyleneglycol dimethacrylate and 10 parts of heptyl methacrylate are dispersed in an aqueous phase containing 1.25 parts of acetic acid, 2.5 parts of N,N-dimethyl-octadecylamine and 220 parts of water. The mass is purged with nitrogen and heated up to about 65° C. Then 25 parts of acetone and 0.25 parts of 4,4'-azo-bis-(4-cyanopentanoic) acid are added. It is maintained at 65° C. under a stream of nitrogen for about 4 hours, left to cool and filtered. A finely divided latex $A_9$ is thus obtained, of which the proportion of dry material is about 30%.

50 parts of this latex $A_9$ are mixed with 46.9 parts of the latex $B_4$ described in paragraph (b) of Example 4. A composition $A_9 + B_4$ according to the invention is thus obtained, containing 31% of dry material.

A treatment bath is prepared containing per liter 37.4 g of the mixture $A_9 + B_4$, 18.7 g of an aqueous dispersion of the reaction product of stearic acid with hexa(methoxy-methyl)melamine (about 30% of dry material), 31 g of a 36% aqueous solution of a glyoxal-urea-formaldehyde condensate, 25 g of an aqueous solution of zirconium acetate (22% $ZrO_2$) and 5 g of magnesium chloride.

A cotton fabric and a polyester fabric are foularded in this bath with respective rates of expression of about 70% and 45%. After drying, the fabrics are treated for 4 minutes at 165° C. by means of a BENZ thermo-condenser.

The following Table indicates the results of the oilproofing and waterproofing measures effected on the fabrics thus treated.

| Fabric of | Oilproofing "Test 3 M" | Waterproofing "Spray-test" |
|---|---|---|
| polyester | 80 | 100 |
| Cotton | 80 | 80 |

EXAMPLE 10

The operation is as in the first paragraph of Example 8, but the N,N-bis-(hydroxyethyl)-2-perfluoro-octyl ethylamine is replaced by the same quantity of 3-(perfluoro-octyl propionylamino)-propyl-3-dimethylammonium-propionate and only 1.25 parts of acetic acid are used. A finely divided latex $A_{10}$ is thus obtained, of which the proportion of dry material is about 29%.

172.4 parts of the latex $A_{10}$ are mixed with 156.2 parts of the latex $B_4$ described in paragraph (b) of Example 4. A composition $A_{10} + B_4$ according to the invention is obtained, which contains 30% of dry material and which, when applied to cotton satin and "Tergal twill" fabrics under the same conditions as in Example 2, gives similar results.

EXAMPLE 11

In a container fitted with a stirrer, a reflux condenser and a heating device, 8.9 parts of the monomer of formula (IV) and 0.9 parts of heptyl methacrylate are dispersed in an aqueous phase containing 10 parts of a 20% by weight solution in acetone of the condensation product of triethanolamine with N-(hydroxymethyl) carbamate of 1H, 1H, 2H, 2H-heptadecafluorodecanol, 0.35 parts of a 57% aqueous solution of N-methylol acrylamide and 30 parts of water. The mass is purged with nitrogen and heated up to about 65° C. Then 0.2 parts of 130 volume hydrogen peroxide are added and it is maintained at 65° C. under a stream of nitrogen for about three and a half hours. After cooling and filtering, a finely divided latex $A_{11}$ is obtained, of which the proportion of dry material is about 20%.

250 parts of the latex $A_{11}$ thus prepared are mixed with 156.25 parts of the latex $B_4$ described in paragraph (b) of Example 4. A composition $A_{11} + B_4$ is thus obtained which contains about 24% of dry material and has properties similar to those of the composition $A_2 + B_2$ of Example 2.

EXAMPLE 12

(a) In a container fitted with a stirrer, a reflux condenser and a heating device, 49 parts of the monomer of formula (III) and 49 parts of heptyl methacrylate are dispersed in an aqueous phase containing 5.6 parts of N,N-dimethyloctadecylamine, 14 parts of acetic acid, 3.5 parts of a 57% aqueous solution of N-methylol acrylamide, 0.1 parts of laurylmercaptan and 250 parts of water. The mass is purged with nitrogen and heated to about 75° C. Then 30 parts of acetone and 0.5 parts of 4,4'-azo-bis-(4-cyano-pentanoic) acid are added and the mixture is maintained at 75° C. for about 4 hours under a stream of nitrogen, and filtered. A finely dispersed latex $A_{12}$ is thus obtained, of which the proportion of dry material is about 25%.

b. In a container identical with that mentioned above, 30 parts of water, 5 parts of acetone, 1.25 parts of 130 volume hydrogen peroxide and 0.25 parts of 4,4'-azo-bis-(4-cyano-pentanoic)-acid are charged. The mass is purged with nitrogen and heated to about 70° C. Then an emulsion comprising 190 parts of water, 4 parts of N,N-dimethyloctadecylamine, 5 parts of acetic acid, 3.5 parts of a 57% aqueous solution of N-methylol acrylamide, 12.5 parts of acetone, 1.25 parts of t-dodecylmercaptan, 9 parts of the monomer of formula (IV), 89 parts of heptyl methacrylate and 0.25 parts of 4,4'-azo-bis-(4-cyano-pentanoic) acid is run in continuously over a period of about 3 hours and while maintaining at 70° C. The product is then maintained at 70° C. for a further 2 hours, cooled and filtered. A finely divided latex $B_{12}$ is thus obtained, of which the proportion of dry material is about 30%.

c. 120 parts of the latex $A_{12}$ are mixed with 233.3 parts of the latex $B_{12}$. A composition $A_{12} + B_{12}$ is thus obtained, which contains about 28% of dry material and which, when applied to cotton fabric and polyester fabric as directed in Example 2, imparts to these fabrics good water-repellent and oil-repellent properties.

EXAMPLE 13

In a container fitted with a stirrer, a reflux condenser and a heating device, 9.8 parts of the monomer of formula (IV) are dispersed in an aqueous phase containing 0.2 parts of cetyltrimethylammonium bromide, 0.51 parts of an acetic solution containing 39% of $N_3,N_3,N_6,N_6$-tetra(hydroxymethyl)-2-vinyl-4,6-diamino-s.triamine, 5 parts of acetic acid and 30 parts of water. The mass is purged with nitrogen and heated to about 65° C. Then 0.2 parts of 130 volume hydrogen peroxide are added and the mixture is maintained at 65° C. under a stream of nitrogen for 2 hours. After cooling and filtering, a finely dispersed latex $A_{13}$ is thus obtained, of which the proportion of dry material is about 20%.

400 parts of the latex $A_{13}$ thus obtained are mixed with 66.6 parts of the latex $B_{12}$ described in paragraph (b) of Example 12. A composition $A_{13} + B_{12}$ according to the invention is thus obtained which contains about 21% of dry material which, when applied to cotton and polyester fabrics under the same conditions as in Example 2, imparts to these fabrics good water-repellent and oil-repellent properties.

EXAMPLE 14

A trouser fabric made of polyester-cotton tricotine is treated with the following mixture:

5 g/l of a water-repelling agent formed from a condensate of stearic acid and methylol melamines prepared according to Example 1 of French Pat. No. 1,065,686; 1 ml/l of acetic acid; 30 g/l of cross-linking agent E based upon a dimethylol-dihydroxy-ethylene urea in aqueous solution containing 36% of active substance; 15 g/l of cross-linking agent F based upon an aqueous solution of technical melamine hexamethylol containing 65% of active substance; 4 g/l of zinc nitrate; 50 g/l of cross-linking agent G based upon a mixture of the latexes $A_2$ and $B_2$ in the above Example 2 in the proportions 45/55. The application is effected by foularding, the rate of expression is 50%. Drying is effected and then a thermal treatment for 50 seconds at 175° C. The results are given at the end of Example 17.

EXAMPLE 15

An anorak fabric made of viscose-polyamide taffeta is treated with the following mixture:

20 g/l of cross-linking agent F of Example 14; 2 g/l of zinc nitrate; acetic acid to give a pH of 4; 20 g/l of cross-linking agent G of Example 14. During the foularding process, the rate of expression is 45% the drying process lasts for 30 seconds at 180° C. The results are given at the end of Example 17.

EXAMPLE 16

An umbrella fabric made of polyamide taffeta is treated with 20 g/l of cross-linking agent G of Example 14. During foularding the rate of expression is 40%. Drying lasts for 30 seconds at 180° C. The results are given at the end of the following Example.

EXAMPLE 17

A filtration cloth for industrial use made of cut polyester fibres is treated with:

50 g/l of cross-linking agent G of Example 14. During foularding, the rate of expression is 50%. Drying lasts for 30 seconds at 180° C.

For the above Examples 14, 15, 16 and 17, the results of the A A T C C oil-repellent test before washing are 6,6,6 and 6 respectively whereas after washing they are 5,5,5 and 6; those of the water-repellent test ("Spray test") before washing are 100, 100, 100 and 100 and after washing they are, 90, 100, 100 and 100.

EXAMPLE 18

A cotton fabric is treated with the following mixture: 30 g/l of cross-linking agent G of Example 14; 30 g/l of cross-linking agent F of Example 14; 30 g/l of non-ionic dispersion containing 20% of a polyethylene wax with a melting point between 50° C and 60° C. with an oxyethylenate $C_{12}$ to $C_{14}$ fatty alcohol as dispersing agent; and 3 g/l of lactic acid. During the foularding process the rate of expression is 85%. Drying is carried out and thermofixation is effected in 3 minutes 30 seconds at 165° C. Before washing, the A A T C C oil-repellent test gives 6 and after washing 6 again, the water-repellent test ("Spray test") being 100 before washing and 90 after washing. These results may therefore be considered to be very satisfactory.

In Examples 14, 15, 16 and 18 the washing process took place in an aqueous medium with a solution containing 5 g/l of a current commercial lye for 30 minutes at 60° C. and for Example 17 the washing process took place in a solvent medium.

What we claim is:

1. Mixture comprising:
   I. An aqueous dispersion of a copolymer (A) consisting essentially of in interpolymerized form:
      1. 30% to 99% by weight of one or more monomers of the formula:

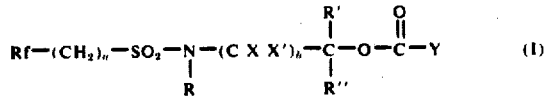

(I)

in which Rf represents a perfluoro straight or branched alkyl group containing from 1 to 20 carbon atoms, $a$ is a whole number between 2 and 20 inclusive, R represents a hydrogen atom or an alkyl group containing 1 to 10 carbon atoms, a cycloalkyl group containing 5 to 12 carbon atoms, an hydroxyalkyl group containing 2 to 4 carbon atoms or an aryl group unsubstituted or substituted by an alkyl radical containing 1 to 6 carbon atoms, R', R'', X and X' are the same or different and represent hydrogen atoms or alkyl groups containing 1 to 4 carbon atoms. $b$ is a whole number between 1 and 4 inclusive, and Y represents the residue from removal of a carboxyl group of an alkenemono- or -di-carboxylic acid or a monoalkyl ester of such a dicarboxylic acid;

2. Up to 70% by weight of one or more compounds containing at least one polymerizable ethylene linkage and no perfluoro groups; and
3. Up to 10% by weight of one or more monomers different from the compounds of (A) (2) and containing an ethylene linkage and at least one reactive group, said reactive group being an OH, NH$_2$, NH-alkyl, COOMe, SO$_3$H,

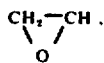

CN,

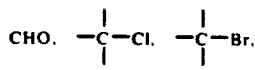

—SO$_2$-CH=CH$_2$ or —NH—CO—CH=CH$_2$ group; and

II. An aqueous dispersion of a copolymer (B) different from copolymer (A) and consisting essentially of in an interpolymerized form:
1. 1% to 70% by weight of one or more monomers of formula (I);
2. 30% to 99% by weight of one or more compounds containing at least one polymerizable ethylene linkage and no perfluoro groups; and
3. 0% to 10% by weight of one or more monomers different from the compounds of (B)(2) and containing an ethylene linkage and at least one reactive group, said reactive group being an OH, NH$_2$, NH-alkyl, COOMe, SO$_3$H,

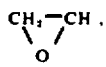

CN,

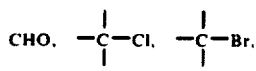

—SO$_2$—CH=CH$_2$ or —NH-CO—CH=CH$_2$ group; and wherein said mixture contains an aqueous dispersion of a copolymer (A) containing a large proportion of said perfluoro alkyl groups with an aqueous dispersion of a copolymer (B) containing a relatively small proportion of perfluorinated groups,
the weight of one or more monomers of the formula (I) contained in the copolymer (A) being greater than that of one or more monomers of the formula (I) contained in the copolymer (B).

2. Mixture according to claim 1 wherein the weight of one or more monomers of the formula (I) contained in the copolymer (A) is equal to a greater than 1.5 times and not superior to 30 times the weight of one or more monomers of the formula (I) contained in the copolymer (B).

3. Mixture according to claim 1 wherein R represents an aryl group substituted by an alkyl radical containing 1 to 6 carbon atoms.

4. Mixture according to claim 1 wherein Rf contains 2 to 10 carbon atoms.

5. Mixture according to claim 1 wherein $a$ is 2 or 4.

6. Mixture according to claim 1 wherein $b$ is 1 or 2.

7. Mixture according to claim 1 wherein the proportion of copolymer (A) represents 30% to 80% of the total weight of the copolymers.

8. Mixture according to claim 1 wherein the proportion of dry material is between 20% and 50% by weight.

9. Composition for oil-repellent and water-repellent treatment containing a mixture according to claim 1.

10. Process for the preparation of a mixture as claimed in claim 1 which comprises
A. copolymerizing 30% to 99% by weight of one or more of said monomers of formula (I) as defined in claim 1; up to 70% by weight of one or more of said compounds containing at least one polymerizable ethylenic linkage, free from perfluoro groups; and up to 10% by weight of one or more of said monomers containing an ethylenic linkage and at least one reactive group; in aqueous phase, at a pH from 2 to 9 and in the presence of 0.01% to 5% of a copolymerization catalyst;
B. copolymerizing 1% to 70% by weight of one or more of said monomers of formula (I) as defined in claim 1; 30% to 99% by weight of one or more of said compounds containing at least one polymerizable ethylenic linkage, free from perfluoro groups; and 0% to 10% by weight of one or more of said monomers containing an ethylenic linkage and at least one reactive group; in aqueous phase, at a pH from 2 to 9 and in the presence of 0.01% to 5% of a copolymerization catalyst; and
C. mixing the aqueous dispersions obtained under (A) and (B),
wherein the weight of one or more monomers of the formula (I) contained in the copolymer (A) being greater than that of one or more monomers of the formula (I) contained in the copolymer (B).

11. Process according to claim 10 wherein the weight of one or more monomers of the formula (I) contained in the copolymer (A) is equal to or greater than 1.5 times and not superior to 30 times the weight of one or more monomers of the formula (I) contained in the copolymer (B).

12. Process according to claim 10 wherein the proportion of catalyst in each of (A) and (B) is from 0.1% to 1.5%.

13. Process according to claim 10 wherein the copolymerisations defined in (A) and (B) are each effected in the presence of a proportion of a chain transfer agent of form 0.01% to 3% by weight of the monomer.

14. Process according to claim 13 wherein the proportion of the chain transfer agent is from 0.05% to 0.05%.

15. Process according to claim 10 wherein the copolymerisation in (A) and (B) is effected at a temperature of between 40° C. and 120° C.

16. Process according to claim 10 wherein the copolymerisation in (A) and (B) is effected at a temperature between 50° C and 90° C.

17. Mixture comprising:
I. An aqueous dispersion of a copolymer (A) consisting essentially of in interpolymerized form:

1. 30% to 99% by weight of one or more monomers of the formula:

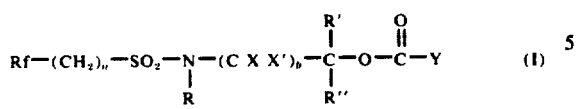 (I)

in which Rf represents a perfluoro straight or branched alkyl group containing from 1 to 20 carbon atoms, $a$ is a whole number between 2 and 20 inclusive, R represents a hydrogen atom or an alkyl group containing 1 to 10 carbon atoms, a cycloalkyl group containing 5 to 12 carbon atoms, an hydroxyalkyl group containing 2 to 4 carbon atoms or an aryl group unsubstituted or substituted by an alkyl radical containing 1 to 6 carbon atoms, R', R'', X and X' are the same or different and represent hydrogen atoms or alkyl groups containing 1 to 4 carbon atoms, $b$ is a whole number between 1 and 4 inclusive, and Y represents the residue from removal of a carboxyl group of an alkene- mono- or -di-carboxylic acid or a monoalkyl ester of such a dicarboxylic acid;

2. Up to 70% by weight of one or more compounds containing at least one polymerizable ethylene linkage and no perfluoro groups; and 3. Up to 10% by weight of one or more monomers different from the compounds of (A)(2) and containing an ethylene linkage and at least one reactive group, said reactive group being an OH, $NH_2$, NH-alkyl, COOMe, $SO_3H$,

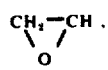

CN,

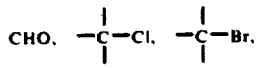

—$SO_2$—CH=$CH_2$ or —NH—CO—CH=$CH_2$ group; and

II. An aqueous dispersion of a copolymer (B) different from copolymer (A) and consisting essentially of in an interpolymerized form:

1. 4% to 70% by weight of one or more monomers of formula (I);
2. 30% to 99% by weight of one or more compounds containing at least one polymerizable ethylene linkage and no perfluoro groups; and
3. 0% to 10% by weight of one or more monomers different from the compounds of (B)(2) and containing an ethylene linkage and at least one reactive group, said reactive group being an OH, $NH_2$, NH-alkyl, COOMe, $SO_3H$,

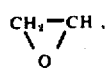

CN,

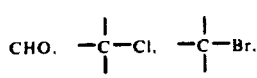

—$SO_2$—CH=$CH_2$ or —NH—CO—CH=$CH_2$ group; and wherein said mixture contains an aqueous dispersion of a copolymer (A) containing a large proportion of said perfluoro alkyl groups with an aqueous dispersion of a copolymer (B) containing a relatively small proportion of perfluorinated groups, the weight of one or more monomers of the formula (I) contained in the copolymer (A) is equal to or greater than 1.5 times and not superior to 30 times the weight of one or more monomers of the formula (I) contained in the copolymer (B).

18. Process for the preparation of a mixture as claimed in claim 17 which comprises:
   A. copolymerizing 30% to 99% by weight of one or more of said monomers of formula (I) as defined in claim 17; up to 70% by weight of one or more of said compounds containing at least one polymerizable ethylenic linkage, free from perfluoro groups; and up to 10% by weight of one or more of said monomers containing an ethylenic linkage and at least one reactive group; in aqueous phase, at a pH from 2 to 9 and in the presence of 0.01% to 5% of a copolymerization catalyst;
   B. copolymerizing 4% to 70% by weight of one or more of said monomers of formula (I) as defined in claim 17; 30% to 99% by weight of one or more of said compounds containing at least one polymerizable ethylenic linkage, free from perfluoro groups; and 0% to 10% by weight of one or more of said monomers containing an ethylenic linkage and at least one reactive group; in aqueous phase, at a pH from 2 to 9 and the presence of 0.01% to 5% of a copolymerization catalyst; and
   C. mixing the aqueous dispersions obtained under (A) and (B), wherein the weight of one or more monomers of the formula (I) contained in the copolymer (A) is equal to or greater than 1.5 times and not superior to 30 times the weight of one or more monomers of the formula (I) contained in the copolymer (B).

19. Mixture comprising:
   I. An aqueous dispersion of a copolymer (A) consisting essentially of in interpolymerized form:
      1. 30% to 99% by weight of one or more monomers of the formula:

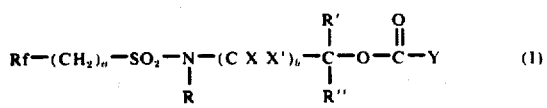 (I)

in which Rf represents a perfluoro straight or branched alkyl group containing from 1 to 20 carbon atoms, $a$ is a whole number between 2 and 20 inclusive, R represents a hydrogen atom or an alkyl group containing 1 to 10 carbon atoms, a cycloalkyl group containing 5 to 12 carbon atoms, an hydroxyalkyl group containing 2 to 4 carbon atoms or an aryl group unsubstituted or substituted by an alkyl radical containing 1 to 6 carbon atoms, R', R'', X and X' are the same or different and represent hydrogen atoms or alkyl groups containing 1 to 4 carbon atoms, $b$ is a whole number between 1 and 4 inclusive, and Y represents the residue from removal of a carboxyl group of an alkene- mono- or di-carboxylic acid or a monoalkyl ester of such a dicarboxylic acid;

2. Up to 70% by weight of one or more compounds containing at least one polymerizable ethylene linkage and no perfluoro groups selected from the group consisting of ethylene, propylene, isobutene, 3-chloro-isobutene-1, butadiene, isoprene, chloro- and dichloro-butadienes, fluoro- and difluoro-butadienes, 2,5-dimethyl-1,5-hexadiene, vinyl, or vinylidene chloride, vinyl or vinylidene fluoride, allyl bromide, styrene, vinyltoluene, α-methyl-styrene, α-cyanomethyl-styrene, divinyl-benzene, vinyl acetate, vinyl propionate, vinyl isobutyrate, vinyl senecioate, vinyl succinate, vinyl isodecanoate, vinyl stearate, allyl acetate and allyl heptanoate, cetyl vinyl ether, vinyl methylketone, acrylic, methacrylic, α-chloro-acrylic, crotonic, maleic, fumaric, itaconic, citraconic and senecioic acids, allyl, methyl, ethyl butyl, isobutyl, hexyl, heptyl, 2-ethylhexyl, lauryl, stearyl, or alkoxyethyl acrylates and methacrylates, dimethyl maleate, ethyl crotonate, acid methyl maleate, acid butyl itaconate, acrylonitrile, methacrylonitrile, 2-chloro-acrylonitrile, 2-cyanoethylacrylate, methylene-glutaronitrile, vinylidene cyanide, N-vinylcarbazole, vinyl-pyrrolidone, tetraallyloxyethane, the diacrylates and dimethylacrylates of ethyleneglycol and propyleneglycol, divinyl-carbinol, triacryloyl hexahydro-s-triazine, the acid phosphate of bis(methacryloyloxyethyl), divinyl carbonate, and the triallyl ether of pentaerythritol; and 3. Up to 10% by weight of one or more monomers different from the compounds of (A)(2) and containing an ethylene linkage and at least one reactive group, said reactive group being an OH, $NH_2$, NH-alkyl, COOMe, $SO_3H$,

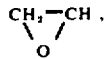

CN,

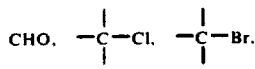

$-SO_2-CH=CH_2$ or $-NH-CO-CH=CH_2$ group, selected from the group consisting of hydroxyalkyl acrylates, ethyleneglycol, nonacrylate of polyalkyleneglycols, allyl alcohols, allyl glycollate, isobutenediol, allyloxy-ethanol, acrylamide and methacrylamide, maleamide and maleimide, N-(cyanoethyl)acrylamide, N-iso-propyl-acrylamide, diacetone-acrylamide, N-(hydroxymethyl) acrylamides and methacrylamides, N-(alkoxymethyl) acrylamides and methacrylamides, the hydroxymethyl derivatives of 2-vinyl-4,6-diamino s-triazine and of isobutenediol carbamate, sodium acrylate or methacrylate, vinylsulphonic and p-styrenesulphonic acids and their alkali metal salts, 3-amino-crotononitrile, monoallylamine, vinyl-pyridines, glycidyl acrylate and methacrylate, allylglycidyl ether, isopropyl cyanoacrylate or ethyl 2-cyano-3-dimethylamino acrylate, dimethylaminoethyl acrylate and methacrylate, acrolein, and acryloyl chloride; and II. An aqueous dispersion of a copolymer (B) different from copolymer (A) and consisting essentially of in an interpolymerized form:

1. 4% to 70% by weight of one or more monomers of formula (I).
2. 30% to 99% by weight of one or more compounds containing at least one polymerizable ethylene linkage and no perfluoro groups; and
3. 0% to 10% by weight of one or more monomers different from the compounds of (B)(2) and containing an ethylene linkage and at least one reactive group, said reactive group being an OH, $NH_2$, NH-alkyl, COOMe, $SO_3H$,

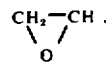

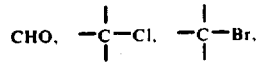

$-SO_2-CH=CH_2$ or $-NH-CO-CH=CH_2$ group; and wherein said mixture contains an aqueous dispersion of a copolymer (A) containing a large proportion of said perfluoro alkyl groups with an aqueous dispersion of a copolymer (B) containing a relavely small proportion of perfluorinated groups, the weight of one or more monomers of the formula (I) contained in the copolymer (A) is equal to or greater than 1.5 times and not superior to 30 times the weight of one or more monomers of the formula (I) contained in the copolymer (B).

* * * * *